United States Patent
Fongalland et al.

(10) Patent No.: US 9,127,182 B2
(45) Date of Patent: Sep. 8, 2015

(54) POLYMER DISPERSION AND ELECTROCATALYST INK

(75) Inventors: Dharshini Chryshantha Fongalland, Slough (GB); Pamela Kapila, Reading (GB); Chandresh Nemchand Malde, Reading (GB); Michael Ian Petch, Reading (GB)

(73) Assignee: JOHNSON MATTHEY FUEL CELLS LIMITED, London (GB)

( * ) Notice: Subject to any disclaimer, the term of this patent is extended or adjusted under 35 U.S.C. 154(b) by 1484 days.

(21) Appl. No.: 11/914,696

(22) PCT Filed: May 17, 2006

(86) PCT No.: PCT/GB2006/050112
§ 371 (c)(1),
(2), (4) Date: Jun. 4, 2008

(87) PCT Pub. No.: WO2006/123187
PCT Pub. Date: Nov. 23, 2006

(65) Prior Publication Data
US 2008/0292943 A1 Nov. 27, 2008

(30) Foreign Application Priority Data
May 18, 2005 (GB) .................. 0510119.1

(51) Int. Cl.
| | |
|---|---|
| H01M 4/02 | (2006.01) |
| C09D 11/52 | (2014.01) |
| H01M 4/86 | (2006.01) |
| H01M 4/88 | (2006.01) |
| H01M 8/10 | (2006.01) |

(52) U.S. Cl.
CPC ............ *C09D 11/52* (2013.01); *H01M 4/8652* (2013.01); *H01M 4/8663* (2013.01); *H01M 4/881* (2013.01); *H01M 4/8828* (2013.01); *H01M 8/1004* (2013.01); *H01M 8/1023* (2013.01); *H01M 8/1039* (2013.01); *H01M 8/1081* (2013.01); *Y02E 60/521* (2013.01)

(58) Field of Classification Search
None
See application file for complete search history.

(56) References Cited

U.S. PATENT DOCUMENTS

| | | | | |
|---|---|---|---|---|
| 4,043,933 | A * | 8/1977 | Breault et al. | 427/115 |
| 4,478,917 | A * | 10/1984 | Fujita et al. | 429/487 |
| 4,849,253 | A * | 7/1989 | Maricle et al. | 427/115 |
| 5,672,439 | A * | 9/1997 | Wilkinson et al. | 429/479 |
| 5,716,437 | A * | 2/1998 | Denton et al. | 106/31.92 |
| 5,861,222 | A | 1/1999 | Fischer et al. | |
| 6,277,512 | B1 * | 8/2001 | Hamrock et al. | 429/492 |
| 2004/0028806 | A1 * | 2/2004 | Higami et al. | 427/58 |
| 2005/0228127 | A1 * | 10/2005 | Tatemoto et al. | 524/805 |
| 2006/0159980 | A1 * | 7/2006 | Pak et al. | 429/40 |

FOREIGN PATENT DOCUMENTS

| | | |
|---|---|---|
| EP | 0 731 520 A1 | 9/1996 |
| JP | 11-45730 | 2/1999 |
| JP | 2005-123106 | 5/2005 |

OTHER PUBLICATIONS

David Thompsett, Fuel Cell Technology Handbook, 2003, CRC Press LLC, Chapter 6, p. 16.*

* cited by examiner

*Primary Examiner* — Maria J Laios
(74) *Attorney, Agent, or Firm* — RatnerPrestia

(57) ABSTRACT

A polymer dispersion comprising one or more proton-conducting polymer materials in a liquid medium, and an electrocatalyst ink comprising one or more electrocatalyst materials and one or more proton-conducting polymer materials in a liquid medium are disclosed. The polymer dispersion and the electrocatalyst ink further comprise a protic acid. Electrocatalyst layers, gas diffusion electrodes, catalyzed membranes and membrane electrode assemblies prepared using the dispersion and/or the ink are also disclosed.

19 Claims, 3 Drawing Sheets

POLYMER DISPERSION AND ELECTROCATALYST INK

CROSS-REFERENCE TO RELATED APPLICATIONS

This application is the U.S. National Phase application of PCT International Application No. PCT/GB2006/050112, filed May 16, 2006, and claims priority of British Patent Application No. 0510119.1, filed May 18, 2005.

FIELD OF THE INVENTION

The present invention relates to a polymer dispersion, an electrocatalyst ink and processes for the preparation thereof. Furthermore, the invention relates to the use of the polymer dispersion or the electrocatalyst ink in the preparation of catalyst layer structures for application in fuel cells and other electrochemical devices.

BACKGROUND OF THE INVENTION

A fuel cell is an electrochemical cell comprising two electrodes separated by an electrolyte. A fuel, e.g. hydrogen or methanol, is supplied to the anode and an oxidant, e.g. oxygen or air, is supplied to the cathode. Electrochemical reactions occur at the electrodes, and the chemical energy of the fuel and the oxidant is converted to electrical energy and heat.

In a proton exchange membrane (PEM) fuel cell, the electrolyte is a solid polymer membrane which is electronically insulating but ionically-conducting. Proton-conducting membranes such as those based on perfluorosulphonic acid materials are typically used, and protons, produced at the anode, are transported across the membrane to the cathode, where they combine with oxygen to create water.

The principle component of a PEM fuel cell is known as a membrane electrode assembly (MEA) and is essentially composed of five layers. The central layer is the polymer membrane. On either side of the membrane there is an electrocatalyst layer, typically comprising a platinum-based electrocatalyst. An electrocatalyst is a catalyst that promotes the rate of an electrochemical reaction. Finally, adjacent to each electrocatalyst layer there is a gas diffusion material. The gas diffusion material is porous and electrically conducting. It allows the reactants to reach the electrocatalyst layer and conducts the electric current that is generated by the electrochemical reactions.

The MEA can be constructed by several methods. The electrocatalyst layer may be applied to the gas diffusion material to form a gas diffusion electrode. Two gas diffusion electrodes can be placed either side of a membrane and laminated together to form the five-layer MEA. Alternatively, the electrocatalyst layer may be applied to both faces of the membrane to form a catalyst coated membrane. Subsequently, gas diffusion materials are applied to both faces of the catalyst coated membrane. Finally, an MEA can be formed from a membrane coated on one side with an electrocatalyst layer, a gas diffusion material adjacent to that electrocatalyst layer, and a gas diffusion electrode on the other side of the membrane.

The electrocatalyst layers usually contain proton-conducting polymer in contact with the electrocatalyst reaction sites. This enables the efficient transport of protons from the anode reaction sites through the polymer membrane to the cathode reaction sites. Incorporation of proton-conducting polymer in the catalyst layer can improve catalyst utilisation, i.e. the proportion of the platinum-based catalyst that actually takes part in the catalytic reaction is increased. The catalyst utilisation is affected by the three-phase interface between the catalyst, the gaseous reactants, and the proton-conducting polymer. Improving the catalyst utilisation can increase the MEA performance (measured as cell voltage at a given current density) without increasing the amount of platinum-based catalyst.

One method of incorporating proton-conducting polymer into an electrocatalyst layer is a method wherein an electrocatalyst ink containing electrocatalyst, a proton-conducting polymer and a solvent is prepared, and the ink is applied to a suitable substrate such as a gas diffusion material, a membrane or a transfer film. Another method of incorporating proton-conducting polymer into an electrocatalyst layer is a method wherein a dispersion of proton-conducting polymer is applied to a pre-formed electrocatalyst layer. EP 731 520 discloses methods of preparing electrocatalyst layers using electrocatalyst inks and/or proton-conducting polymer dispersions, wherein the solvent in the ink or dispersion is predominantly aqueous. It is desirable to use aqueous dispersions and/or inks in industrial manufacturing processes because problems associated with handling and disposing of high volumes of organic solvents are overcome.

SUMMARY OF THE INVENTION

The present inventors have sought to prepare improved aqueous polymer dispersions and electrocatalyst inks. Suitably the dispersions and inks may be used to prepare fuel cell components having improved performance and/or more stable performance.

Accordingly, the present invention provides a polymer dispersion comprising one or more proton-conducting polymer materials in a liquid medium, wherein the total amount of organic components in the liquid medium does not exceed 10 wt %, characterised in that the polymer dispersion further comprises a protic acid.

Furthermore, the present invention provides an electrocatalyst ink comprising one or more electrocatalyst materials and one or more proton-conducting polymer materials in a liquid medium, wherein the total amount of organic components in the liquid medium does not exceed 10 wt %, characterised in that the electrocatalyst ink further comprises a protic acid.

DETAILED DESCRIPTION OF THE INVENTION

Figure 1:
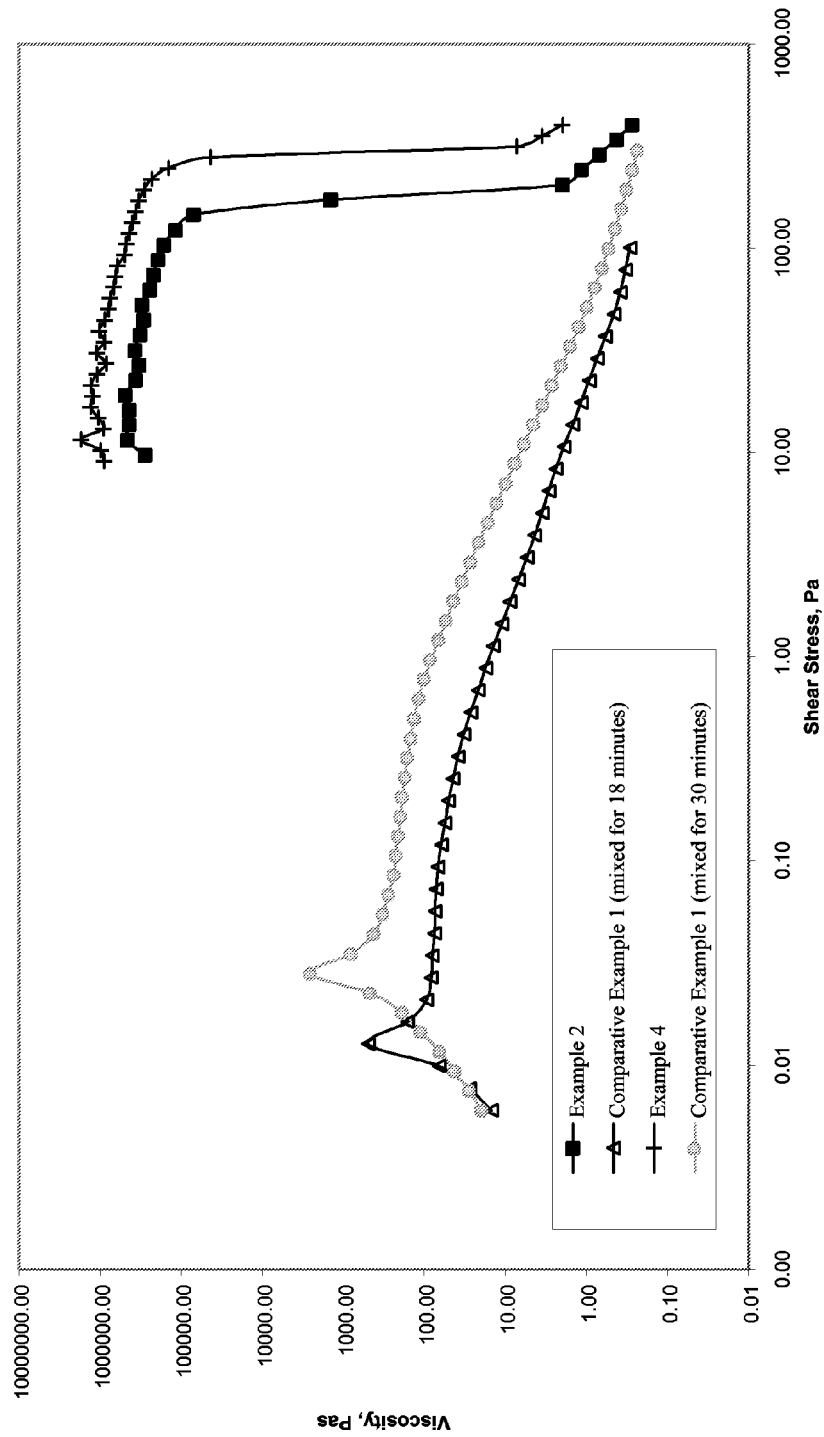
FIG. 1 shows the flow curves (viscosity versus shear stress) for the inks of Comparative Example 1, Example 2, and Example 4.

The inventors have found that membrane electrode assemblies prepared using the polymer dispersions and electrocatalyst inks of the invention have improved performance and/or more stable performance when compared to membrane electrode assemblies produced using polymer dispersions and electrocatalyst inks prepared by state-of-the-art methods. Additionally, the rheological properties of the dispersions and inks of the invention are significantly different to the rheological properties of prior art dispersions and inks and this may allow for development of improved electrocatalyst layer preparation methods.

JP 2005 123106 discloses catalyst inks that comprise a protic acid. However, the present inventors believe that the catalyst inks of JP 2005 123106 are not aqueous inks and that the liquid medium contains significant amounts of organic components. Addition of acid to an organic ink will not have the same effect on the ink properties as has been discovered by the inventors of the present invention with respect to aqueous inks.

The proton-conducting polymer materials in the dispersion and the ink contain acidic groups, but the protic acid is an additional acidic component. The term "protic" is used simply to confirm that the acid is a proton donor, i.e. a Brönsted acid. The protic acid is not a polymeric material and is suitably a mineral acid such as nitric acid or sulphuric acid, and is preferably nitric acid.

The ratio of the number of acidic protons in the protic acid to the number of acidic protons on the one or more proton-conducting polymer materials is suitably at least 0.5, preferably at least 0.8, more preferably at least 1.2, most preferably at least 1.4. The ratio is suitably less than 10, preferably less than 5, most preferably less than 2. The inventors have found that the presence of a protic acid in the dispersion or ink alters the structure of the one or more proton-conducting polymer materials in the dispersion or ink, and this effect becomes more marked as the amount of the protic acid increases. The acid also alters the viscosity of the dispersion or ink, and gel-like dispersions or inks produced by adding large amounts of acid (e.g. a ratio of more than 5) may not be suitable for usual application processes such as spraying or printing. The number of acidic protons in the protic acid is readily determined from the number of moles of protic acid in the dispersion or ink and the formula of the protic acid, e.g. 1 mole of nitric acid ($HNO_3$) provides 1 mole of acidic protons. The number of acidic protons on the one or more proton-conducting polymers is readily determined from the equivalent weight (EW) of the proton-conducting polymer. The EW is defined as the weight of the polymer in acid form (in grams) required to neutralise one mole of NaOH. The EW of most commercial proton-conducting polymers is publicly available. The number of moles of acidic protons on the one or more proton-conducting polymers is the amount of polymer in grams, divided by the EW.

Suitable electrocatalyst materials may be unsupported electrocatalytic metals, or may be electrocatalytic metals supported on a conductive substrate, for example a high surface area particulate carbon. Electrocatalytic metals for use in the present invention may be selected from
(i) the platinum group metals (i.e. platinum, palladium, rhodium, ruthenium, iridium and osmium),
(ii) gold or silver,
(iii) a base metal or base metal oxide,
or an alloy or mixture comprising one or more of these metals. The preferred electrocatalytic metal is platinum, which may be alloyed with other precious metals such as ruthenium, or base metals such as molybdenum, tungsten, cobalt, nickel, chromium or titanium. If the electrocatalyst material is a supported catalyst, the loading of metal particles on the carbon support material is suitably in the range 10-100 wt %, preferably 15-80 wt %.

Preferred proton-conducting polymer materials are perfluorinated sulphonic acid polymers such as Nafion®, Flemion® and Aciplex®. The equivalent weight of the proton-conducting materials is suitably in the range 800-1400, preferably in the range 850-1250.

The total amount of organic components in the liquid medium does not exceed 10 wt %, suitably does not exceed 5 wt % and preferably does not exceed 1 wt %. In a preferred embodiment, the liquid medium is entirely free from organic components. The liquid medium is suitably at least 90 wt % water, preferably at least 95 wt % water and most preferably 99 wt % water. In a preferred embodiment, the liquid medium is 100 wt % water.

In the polymer dispersions and electrocatalyst inks of the invention the structure of the one or more proton-conducting polymer materials is different when compared to the structure of proton-conducting polymer materials in polymer dispersions and electrocatalyst inks produced according to prior art methods. This difference in structure can be analysed by centrifuge experiments wherein the dispersion or ink is separated into a supernatant and a solid deposit. The amount of proton-conducting polymer in the supernatant can be measured by FTIR and is indicative of the degree of association between the proton-conducting polymer particles. If the degree of association between the proton-conducting polymer particles is low, then the amount of proton-conducting polymer in the supernatant will be high; conversely if the degree of association is high, then the amount of proton-conducting polymer in the supernatant will be low. Suitably, when the polymer dispersion or electrocatalyst ink of the invention is centrifuged for 2 hours at 20° C. and 15,000 G' force and separated into a supernatant and a solid deposit, less than 30% of the proton-conducting polymer present in the polymer dispersion or electrocatalyst ink remains in the supernatant, preferably less than 20%, and most preferably less than 10%.

The solid content of the electrocatalyst ink is suitably between 15 and 50 wt %, preferably between 20-35 wt %. The weight ratio of the electrocatalytic metal(s) in the one or more electrocatalyst materials to the one or more proton-conducting polymers in the ink is suitably between 3:1 and 1:3, preferably between 2:1 and 1:2.

A further aspect of the invention provides a process for preparing a polymer dispersion of the invention, comprising steps of
a) preparing a dispersion of one or more proton-conducting polymer materials in a liquid medium, wherein the total amount of organic components in the liquid medium does not exceed 10 wt %; and
b) adding a protic acid to the dispersion.

An alternative process for preparing a polymer dispersion of the invention comprises steps of
a) adding a protic acid to a dispersion of one or more proton-conducting polymers in a liquid medium; and
b) adjusting the total amount of organic components in the liquid medium so that the total amount of organic components in the liquid medium does not exceed 10 wt %.

The dispersion of one or more proton-conducting polymer materials in an essentially aqueous medium (the total amount of organic components does not exceed 110 wt %) may be prepared according to the methods outlined in EP 731 520. Commercial solutions of proton-conducting polymer materials are typically provided in mixtures of organic and aqueous solvents such as mixtures of isopropyl alcohol and water. Essentially aqueous solutions may be prepared by adding additional water, and distilling off the organic solvents. Alternatively, an aqueous solution of a protic acid may be added to a commercial solution of proton-conducting polymer material, and the organic solvents can be distilled off. The total amount of organic components in the liquid medium suitably does not exceed 5 wt % and preferably does not exceed 1 wt %. In a preferred embodiment, the liquid medium is entirely free from organic components.

A process for preparing an electrocatalyst ink of the invention, comprises steps of
- a) preparing a dispersion of one or more proton-conducting polymer materials in a liquid medium, wherein the total amount of organic components in the liquid medium does not exceed 10 wt %;
- b) adding one or more electrocatalyst materials to the dispersion; and
- c) either before or after step (b), adding a protic acid to the dispersion.

An alternative process for preparing an electrocatalyst ink of the invention comprises steps of
- a) adding a protic acid to a dispersion of one or more proton-conducting polymers in a liquid medium;
- b) adjusting the total amount of organic components in the liquid medium so that the total amount of organic components in the liquid medium does not exceed 10 wt %; and
- c) adding one or more electrocatalyst materials to the dispersion.

The dispersion of one or more proton-conducting polymer materials in an essentially aqueous medium may be prepared as disclosed above. The electrocatalyst materials are preferably added to the dispersion with stirring.

The protic acid can be added to the dispersion during preparation of the dispersion, before the addition of the electrocatalyst material to the dispersion or after the addition of the electrocatalyst material to the dispersion. The inventors do not believe that the order of addition of the protic acid and the electrocatalyst material has a significant effect on the properties of the ink. The electrocatalyst ink is preferably left for twelve hours before use. Suitably the ratio of the number of acidic protons in the protic acid to the number of acidic protons on the one or more proton-conducting polymer materials is at least 0.5.

The invention further provides a method for incorporating proton-conducting polymer onto an electrocatalyst layer, comprising applying a polymer dispersion according to the invention to an electrocatalyst layer. The invention also provides a method for incorporating proton-conducting polymer into an electrocatalyst layer comprising steps of
- a) mixing one or more electrocatalyst materials with a polymer dispersion according to the invention to provide an electrocatalyst mixture;
- b) drying the electrocatalyst mixture to provide polymer-impregnated electrocatalyst material;
- c) preparing an electrocatalyst ink comprising the polymer-impregnated electrocatalyst material; and
- d) applying the electrocatalyst ink to a substrate to form the electrocatalyst layer.

The invention further provides a method for preparing an electrocatalyst layer comprising applying an electrocatalyst ink according to the invention to a substrate. The substrate may be a gas diffusion material (which may or may not carry a microporous layer of carbon black and hydrophobic polymer), a polymer electrolyte membrane or a transfer film. The ink may be applied by any method known to the skilled person, e.g. by printing, spraying, vacuum deposition or casting, but is preferably applied by printing.

The invention further provides a method for preparing a gas diffusion electrode. The gas diffusion electrode may be prepared by applying an electrocatalyst ink according to the invention to a gas diffusion material. Alternatively, a gas diffusion electrode may be prepared by applying an electrocatalyst ink according to the invention to a transfer film to form an electrocatalyst layer, and transferring the electrocatalyst layer from the transfer film to a gas diffusion material. A gas diffusion electrode of the invention may also be prepared by applying a polymer dispersion of the invention to a pre-formed gas diffusion electrode. Application of the ink or dispersion may be by any method known to the skilled person, e.g. by printing, spraying, vacuum deposition or casting, but is preferably applied by printing.

The invention yet further provides a method for preparing a catalysed membrane. The catalysed membrane may be formed by applying an electrocatalyst ink according to the invention to a membrane. Alternatively, a catalysed membrane may be prepared by applying an electrocatalyst ink according to the invention to a transfer film to form an electrocatalyst layer, and transferring the electrocatalyst layer from the transfer film to a membrane. A catalysed membrane may also be prepared by applying a polymer dispersion of the invention to a pre-formed catalysed membrane. Application of the ink or dispersion may be by any method known to the skilled person, e.g. by printing, spraying, vacuum deposition or casting, but is preferably applied by printing.

The invention yet further provides a method for preparing a membrane electrode assembly. Gas diffusion electrodes, produced as described above, may be combined with membranes; a catalysed membrane, produced as described above, may be combined with gas diffusion materials.

Experiment shows that electrocatalyst layers and membrane electrode assemblies prepared using the polymer dispersions and electrocatalyst inks according to the invention have different physical properties to electrodes and membrane electrode assemblies prepared using prior art catalyst inks. Therefore, in a yet further aspect the present invention provides electrocatalyst layers, gas diffusion electrodes, catalysed membranes and membrane electrode assemblies prepared using electrocatalyst inks or polymer dispersions according to the invention.

EXAMPLES

The invention will now be described by way of example only which is not intended to be limiting thereof.

Aqueous Naflon® Polymer Dispersion Preparation

Aqueous Naflon® polymer dispersion was prepared from a commercial solution of Naflon® (5 wt % solids in 42-54% 1-Propanol; 40-50% water and ~2-3% Ethanol from DuPont®, EW 1100). Demineralised water was added to the commercial solution, and the organic solvents were removed by distillation.

COMPARATIVE EXAMPLE 1

Electrocatalyst Ink 112.01 g of the aqueous Naflon® polymer dispersion (11.38% solids) was heated to 80° C. while stirring. The solution was concentrated to 103.57 g. An electrocatalyst (60 wt % Pt on Ketjen™ 300JD carbon, 20 g) was slowly added to the hot solution (at 80° C.) while stirring. After the electrocatalyst addition, the solution was mixed by a high shear mixer at 65° C. for 30 minutes. The resulting electrocatalyst ink was left over night before use. The final ink had a solid content of 26.5%.

Example 1

Polymer Dispersions 1M nitric acid was added to six samples of the aqueous Naflon® polymer dispersion while stirring and the dispersion was left overnight. The amount of nitric acid added to the polymer dispersions was varied to provide polymer dispersions wherein the ratio of nitric acid to acidic groups on the Naflon® was 0.44:1, 0.8:1, 1.07:1, 1.33:1, 1.6:1 and 6.8:1.

Example 2

Electrocatalyst Ink

A polymer dispersion prepared according to example 1 was used to prepare an electrocatalyst ink. The electrocatalyst (60 wt % Pt on Ketjen™ 300JD carbon, 20 g) was added to the polymer dispersion at room temperature while stirring. After the electrocatalyst addition, the dispersion was mixed by a high shear mixer for 30 minutes. The ink had a solid content of 26.5%. The resulting electrocatalyst ink was left over night before use. The ratio of nitric acid to acidic groups on the Nafion® was 1.6:1.

Example 3

Electrocatalyst Ink

An electrocatalyst ink was prepared according to example 2 except that the amount of nitric acid was varied so that the ratio of nitric acid to acidic groups on the Naflon® was 0.8:1.

Example 4

Electrocatalyst Ink

Concentrated nitric acid (~10M solution) was slowly added to an electrocatalyst ink prepared according to comparative example 1. The ink was stirred for 3 hours. The resulting electrocatalyst ink was left over night before use. The ink had a solid content of 26.5%. The ratio of nitric acid to acidic groups on the Naflon® was 1.8:1.

Example 5

Electrocatalyst Ink

An electrocatalyst ink was prepared according to example 4 except that the amount of nitric acid was varied so that the ratio of nitric acid to acidic groups on the Naflon® was 0.8:1.

Centrifuge Experiments

Samples of the electrocatalyst inks of comparative example 1 and example 2 were analysed by a centrifuge experiment. The inks were centrifuged for two hours at 20° C. and 15,000 G' force, separating the inks into a solid deposit and a supernatant. The amount of Nafion® remaining in the supernatant that was decanted from the centrifuge was measured by FTIR. The peak height at 1233.5 $cm^{-1}$ was measured and this was compared with a calibration plot to determine the concentration of Nafion® in the supernatant (the peak height is directly proportional to the Naflon® concentration). The amount of Nafion® in the supernatant was calculated from the weight of the supernatant and the percentage Naflon® concentration. Finally, the percentage of Naflon® remaining in the supernatant was determined by dividing the amount of Naflon® in the supernatant by the amount of Naflon® in the electrocatalyst ink.

The percentage of Naflon® remaining in the supernatant decanted from the experiment on the ink of comparative example 1 was 40%. The percentage of Naflon® remaining in the supernatant decanted from the experiment on the ink of example 2 was 4%. The amount of Nafion® remaining in the supernatant from the ink of the invention was significantly less than from the comparative ink.

The polymer dispersions of Example 1 were also tested in centrifuge experiments. Nitric acid was added to aqueous Nafion® solution (containing Nafion® at 12.5 wt %) in different amounts, and then the dispersions were subjected to the centrifuge for two hours at 20° C. and 15,000 G' force. The amount of Nafion® remaining in the supernatant that was decanted from the centrifuge is shown in table 1:

| Ratio of nitric acid to acidic groups on the Nafion ® | 0.44 | 0.8 | 1.07 | 1.33 | 1.6 | 6.8 |
|---|---|---|---|---|---|---|
| Percentage of Nafion ® remaining in the decanted liquid | 79 | 24 | 25 | 10 | 11 | 0 |

Viscosity Experiments

The viscosity of the inks of comparative example 1, example 2 and example 4 was tested using a rheometer. FIG. 1 shows the flow curves (viscosity versus shear stress) for the three inks. There are two flow curves for the ink of comparative example 1: a first flow curve shows measurements taken after the ink was mixed by a high shear mixer for 18 minutes, and a second flow curve shows measurements taken after the ink was mixed by a high shear mixer for 30 minutes. The flow curve for the ink of example 2 was taken after high shear mixing for 18 minutes; the flow curve for the ink of example 4 was taken after high shear mixing for 30 minutes. The flow curves show that the macrostructures of the inks of the invention are significantly different to the macrostructures of the comparative inks. The inks of the invention have considerably higher viscosity.

Figure 2:
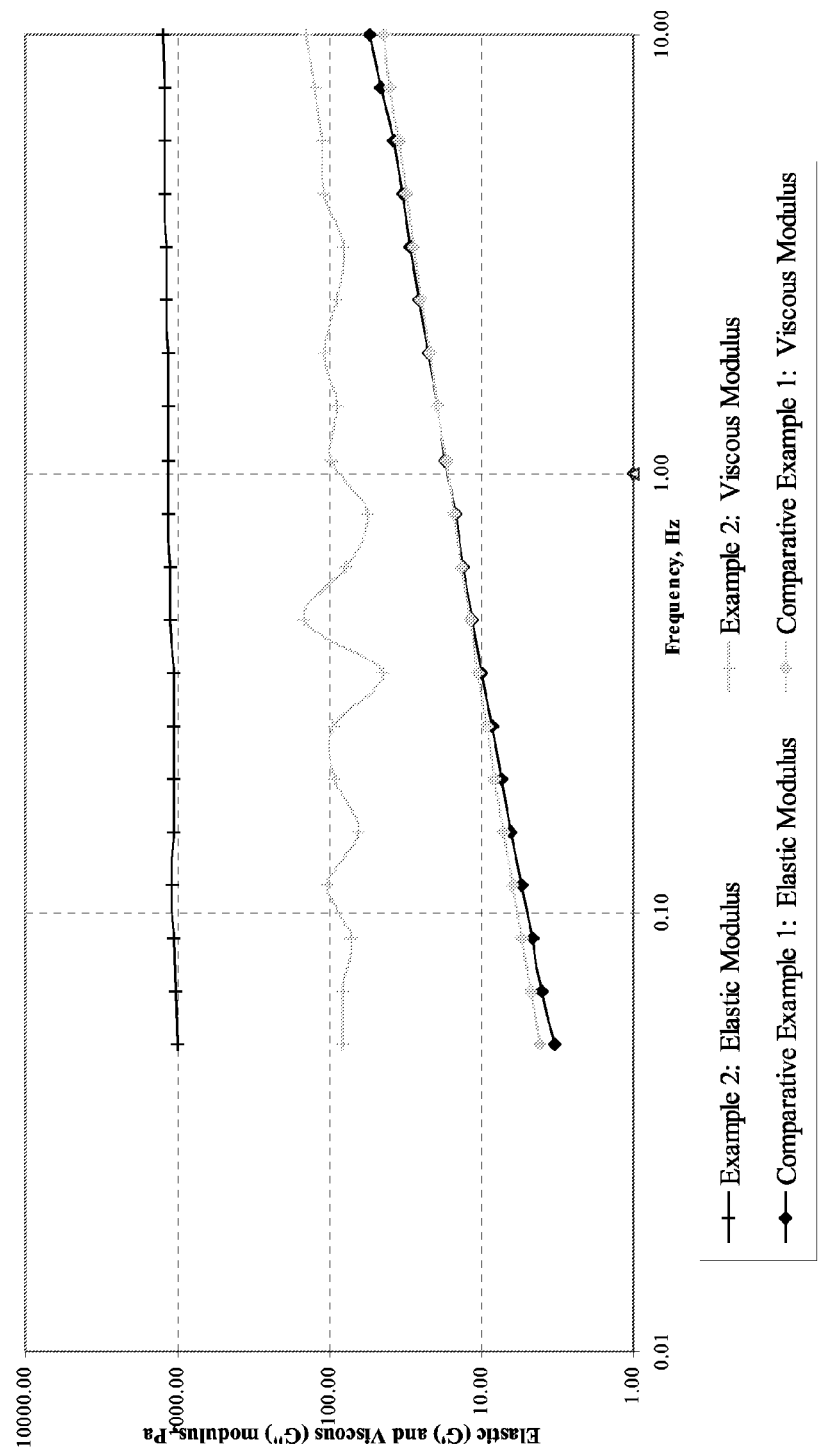
FIG. 2 shows the results of a frequency sweep experiment for the inks of Comparative Example 1 and Example 2.

FIG. 2 shows the results of a frequency sweep experiment for the inks of comparative example 1 and example 2. Measurements of the elastic modulus and the viscous modulus are shown for each ink and it is apparent that the microstructure of the ink of the invention is significantly elastic whereas the comparative ink is viscoelastic.

Membrane Electrode Assembly Preparation

Membrane electrode assemblies containing electrocatalyst layers were prepared using the inks of comparative example 1 and example 2. Gas diffusion electrodes were prepared by applying the ink to a gas diffusion material by screen printing. The gas diffusion material was Toray® TGP-H-060 carbon paper, coated with a microporous layer of carbon black and PTFE. The electrocatalyst ink was applied to the microporous layer, providing a platinum loading of 0.4 g Pt/$m^2$.

Comparative MEA 1 was prepared by combining an anode and a cathode with a 30 μm polymer electrolyte membrane (Flemion® SH-30) to form a membrane electrode assembly. The ink of comparative example 1 was used to prepare the cathode of Comparative MEA 1. The anode was a standard anode comprising a 40 wt % Pt on Vulcan XC72R catalyst.

Example MEA 1 was prepared by combining an anode and a cathode with a 30 μm polymer electrolyte membrane (Flemion®) to form a membrane electrode assembly. The ink of example 2 was used to prepare the cathode of Example MEA 1. The anode was a standard anode comprising a 40 wt % Pt on Vulcan XC72R catalyst.

Performance in a Fuel Cell

Figure 3:
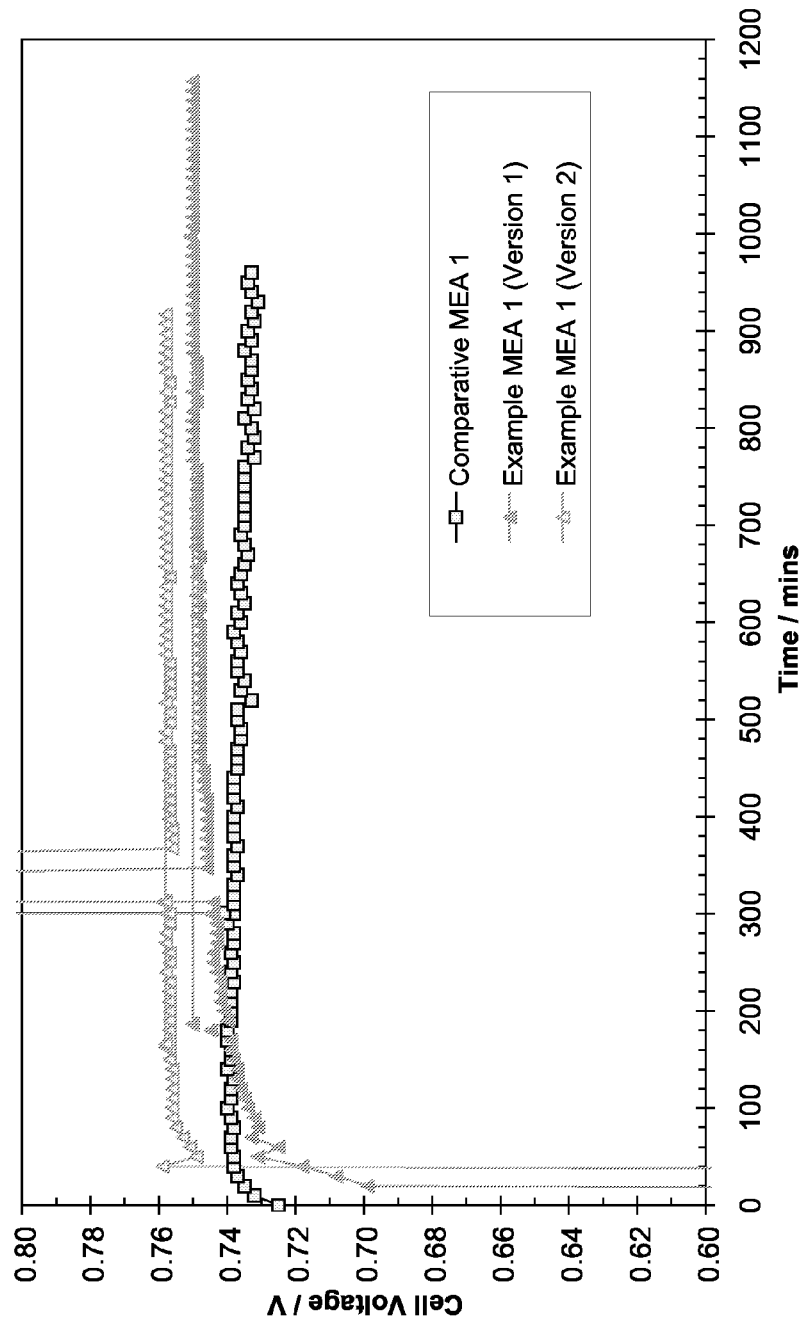
FIG. 3 shows how the cell voltage (measured at 500 mAcm$^{-2}$) vary with time for Comparative MEA 1 and for two samples of Example MEA 1.

Comparative MEA 1 and Example MEA 1 were tested in a fuel cell at 80° C. Hydrogen was supplied to the anode and air was supplied to the cathode at a stoichiometry of 1.5:2.0 and a humidity of 100%. FIG. 3 shows how the cell voltage (measured at 500 mAcm$^{-2}$) varied with time for Comparative MEA 1 and for two samples of Example MEA 1. The Example 1 MEA samples do not show a decrease in cell voltage with time. The only difference between Comparative MEA 1 and Example MEA 1 is that the cathode of Comparative MEA 1 was prepared from the ink of comparative example 1 (which did not contain acid) and the cathode of Example MEA 1 was prepared from the ink of example 2 (which contained nitric acid at a ratio of 1.6:1). FIG. 3 shows that an ink of the invention provides an MEA with more stable performance than MEAs prepared using known inks.

The invention claimed is:

1. A composition for use in preparing a fuel cell consisting of a dispersion, wherein the dispersion consists of a mineral acid and one or more proton-conducting polymer materials dispersed in a liquid medium, wherein the total amount of organic components in the liquid medium does not exceed 10 wt % and the composition does not include an electrocatalyst material and the mineral acid serves as a proton donor in the composition.

2. A composition according to claim 1, wherein a ratio of the number of acidic protons in the mineral acid to the number of acidic protons in the one or more proton-conducting polymer materials is at least 0.5.

3. A composition according to claim 1, wherein the mineral acid is nitric acid or sulphuric acid.

4. A composition according to claim 1, wherein the one or more proton-conducting polymer materials is one or more perfluorinated sulphonic acid polymers.

5. A composition according to claim 1, wherein a ratio of the number of acidic protons in the mineral acid to the number of acidic protons on the one or more proton-conducting polymer materials is less than 10.

6. A composition according to claim 5, wherein the ratio of the number of acidic protons in the mineral acid to the number of acidic protons on the one or more proton-conducting polymer materials is less than 5.

7. A process for preparing the composition according to claim 1, comprising steps of
   a) preparing a dispersion of one or more proton-conducting polymer materials in a liquid medium, wherein the total amount of organic components in the liquid medium does not exceed 10 wt %; and
   b) adding a mineral acid to the dispersion.

8. A process for preparing the composition according to claim 1, comprising steps of
   a) adding a mineral acid to a dispersion of one or more proton-conducting polymers in a liquid medium; and
   b) adjusting the total amount of organic components in the liquid medium so that the total amount of organic components in the liquid medium does not exceed 10 wt %.

9. A method for incorporating a proton-conducting polymer into an electrocatalyst layer, comprising applying the composition according to claim 1 to an electrocatalyst layer.

10. A method for preparing a gas diffusion electrode wherein the composition according to claim 1 is applied to a pre-formed gas diffusion electrode.

11. A method for preparing a membrane electrode assembly wherein the gas diffusion electrode is prepared according to claim 10 and is combined with a membrane.

12. A method for preparing a catalysed membrane wherein the composition according to claim 1 is applied to a pre-formed catalysed membrane.

13. A method for preparing a membrane electrode assembly wherein the catalysed membrane is prepared according to claim 12 and is combined with a gas diffusion material.

14. A gas diffusion electrode prepared with the dispersion according to claim 1.

15. A catalysed membrane prepared with the dispersion according to claim 1.

16. A membrane electrode assembly prepared with the dispersion according to claim 1.

17. A composition for use in preparing a fuel cell consisting of a dispersion, wherein the dispersion consists of a mineral acid and one or more proton-conducting polymer materials dispersed in a liquid medium, wherein the total amount of organic components in the liquid medium does not exceed 10 wt % and the composition does not include an electrocatalyst material and the composition has a viscosity suitable for application of the composition during the preparation of a fuel cell to form a layer of the fuel cell.

18. A composition according to claim 17, wherein a ratio of the number of acidic protons in the mineral acid to the number of acidic protons on the one or more proton-conducting polymer materials is less than 10.

19. A composition according to claim 18, wherein the ratio of the number of acidic protons in the mineral acid to the number of acidic protons on the one or more proton-conducting polymer materials is less than 5.

* * * * *

UNITED STATES PATENT AND TRADEMARK OFFICE
CERTIFICATE OF CORRECTION

PATENT NO. : 9,127,182 B2
APPLICATION NO. : 11/914696
DATED : September 8, 2015
INVENTOR(S) : Fongalland et al.

Page 1 of 1

It is certified that error appears in the above-identified patent and that said Letters Patent is hereby corrected as shown below:

On the title page item [22], PCT Filed:

"May 17, 2006" should read --May 16, 2006--

Signed and Sealed this
Nineteenth Day of April, 2016

Michelle K. Lee
*Director of the United States Patent and Trademark Office*